(12) United States Patent
Cordatos

(10) Patent No.: US 10,576,397 B2
(45) Date of Patent: Mar. 3, 2020

(54) HOLLOW-FIBER MEMBRANE FOR FUEL DEGASSING

(71) Applicant: Hamilton Sundstrand Corporation, Charlotte, NC (US)

(72) Inventor: Haralambos Cordatos, Colchester, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 273 days.

(21) Appl. No.: 15/682,588

(22) Filed: Aug. 22, 2017

(65) Prior Publication Data

US 2019/0060787 A1 Feb. 28, 2019

(51) Int. Cl.
| | | |
|---|---|---|
| *B01D 19/00* | (2006.01) | |
| *F02C 7/22* | (2006.01) | |
| *B64D 37/34* | (2006.01) | |
| *B01D 63/04* | (2006.01) | |
| *B01D 71/36* | (2006.01) | |
| *B01D 69/08* | (2006.01) | |

(Continued)

(52) U.S. Cl.
CPC ........ *B01D 19/0031* (2013.01); *B01D 19/00* (2013.01); *B01D 19/0036* (2013.01); *B01D 63/04* (2013.01); *B01D 67/0018* (2013.01); *B01D 69/02* (2013.01); *B01D 69/08* (2013.01); *B01D 69/10* (2013.01); *B01D 69/12* (2013.01); *B01D 71/36* (2013.01); *B64D 37/34* (2013.01); *F02C 7/22* (2013.01); *B01D 71/34* (2013.01); *B01D 71/64* (2013.01); *B01D 2313/06* (2013.01); *B01D 2323/08* (2013.01); *B01D 2325/023* (2013.01); *B64D 27/10* (2013.01); *F05D 2220/323* (2013.01); *F05D 2240/35* (2013.01); *F05D 2260/608* (2013.01); *F23K 2900/05082* (2013.01)

(58) Field of Classification Search
CPC ................ B01D 19/00; B01D 19/0036; B01D 19/0031; B01D 46/00; F02C 7/22
USPC ............................................................... 96/4
See application file for complete search history.

(56) References Cited

U.S. PATENT DOCUMENTS

| | | | |
|---|---|---|---|
| 5,914,154 A | 6/1999 | Nemser | |
| 6,379,796 B1 * | 4/2002 | Uenishi | ............. B01D 19/0031 428/375 |

(Continued)

FOREIGN PATENT DOCUMENTS

| | | |
|---|---|---|
| WO | 2005/025718 A1 | 3/2005 |
| WO | 2016/168644 A1 | 10/2016 |

OTHER PUBLICATIONS

Teoh, May May et al., Dual-layer PVDF/PTFE composite hollow fibers with a thin macrovoid-free selective layer for water production via membrane distillation, Chemical Engineering Journal, vol. 171, No. 2, Jul. 1, 2011, pp. 684-691.

(Continued)

*Primary Examiner* — Robert A Hopkins
(74) *Attorney, Agent, or Firm* — Carlson, Gaskey & Olds, P.C.

(57) ABSTRACT

A system for degassing a hydrocarbon fluid from a hydrocarbon liquid has a plurality of hollow tube membranes. The hollow tube membranes are formed of a plastic providing an inner support body and an outer selective layer which is denser than the inner support body. The inner support body is formed of spherulitic structures. A fuel supply system and a method are also disclosed.

20 Claims, 2 Drawing Sheets

(51) Int. Cl.
*B01D 69/02* (2006.01)
*B01D 67/00* (2006.01)
*B01D 69/10* (2006.01)
*B01D 69/12* (2006.01)
B64D 27/10 (2006.01)
B01D 71/34 (2006.01)
B01D 71/64 (2006.01)

(56) References Cited

U.S. PATENT DOCUMENTS

| | | |
|---|---|---|
| 6,896,717 B2 | 5/2005 | Pinnau et al. |
| 7,175,693 B2 | 2/2007 | Spadaccini et al. |
| 7,182,870 B2 | 2/2007 | Minegishi et al. |
| 7,393,388 B2 | 7/2008 | Spadaccini et al. |
| 7,615,104 B2 | 11/2009 | Cordatos et al. |
| 8,177,884 B2 | 5/2012 | Schmidt et al. |
| 8,366,804 B2 | 2/2013 | Liu et al. |
| 8,523,982 B2 | 9/2013 | Suefuji et al. |
| 9,186,622 B1 | 11/2015 | Ranjan et al. |
| 2003/0094409 A1 | 5/2003 | Minegishi et al. |
| 2010/0071559 A1 | 3/2010 | Miachon et al. |

OTHER PUBLICATIONS

Liu, Min et al., Formation of microporous polymeric membranes via thermally induced phase separation: A review, Frontiers of Chemical Science and Engineering, Higher Education Press, Heidelberg, vol. 10, No. 1, Feb. 22, 2016, pp. 57-75.
European Search Report for EP Application No. 18190238.8 dated Feb. 5, 2019.

* cited by examiner

HOLLOW-FIBER MEMBRANE FOR FUEL DEGASSING

BACKGROUND OF THE INVENTION

This application relates to hollow fibers which provide a gas separation function in a fuel supply system.

Gas turbine engines are known and typically include a fuel supply for supplying fuel to a combustor. The fuel is mixed with air and ignited.

It is known that if oxygen is dissolved in the fuel when its temperature exceeds approximately 250 F, carbonaceous deposits will form. This is undesirable.

Thus, it is known to provide oxygen removal systems in a fuel supply system, such as for a gas turbine engine. While various geometries of oxygen removal systems are known, one that has promise is a bundle of hollow tubes. The fuel is passed over the hollow tubes and dissolved gases pass through the tubes into an interior of the tubes. The dissolved gases are then removed from the interior, such as through a vacuum.

The hollow tubes may be formed of various plastics. The tubes which are utilized may have application in other gas removal systems. As an example, one major manufacturer of such gas removing hollow tube membranes is directed to water purification purposes. For water purification purposes, there may be low porosity at the outer surface, but much greater porosity radially inwardly. The radially inward structure of the hollow tube provides support for the outer surface. Due to the structure, the support may be inadequate for water purification.

Such structures may not be suitable for gas turbine engine fuel supply systems. This is particularly true with regard to modern gas turbine engines. The fuel systems of modern gas turbine engines operate at high temperature and high pressure. If used in gas turbine engine applications, the inward support on the known tubes may result in collapse of the tubes, which is, of course, undesirable.

SUMMARY OF THE INVENTION

A system for degassing a hydrocarbon fluid from a hydrocarbon liquid has a plurality of hollow tube membranes. The hollow tube membranes are formed of a plastic providing an inner support body and an outer selective layer which is denser than the inner support body. The inner support body is formed of spherulitic structures. A fuel supply system is also disclosed.

A fuel supply system and a method are also disclosed.

These and other features may be best understood from the following drawings and specification.

DETAILED DESCRIPTION

Figure 1:
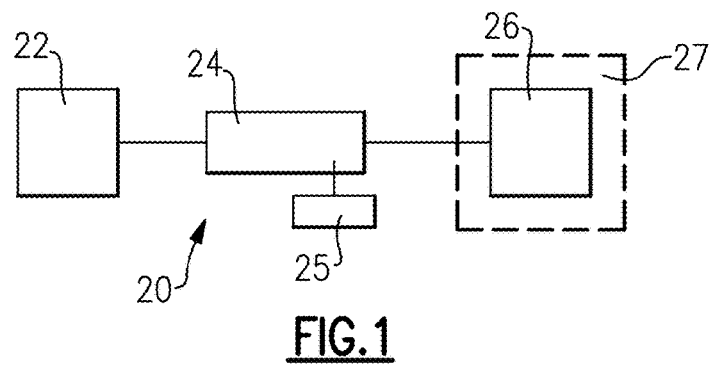
FIG. 1 schematically shows a fuel supply system for a gas turbine engine.

FIG. 1 schematically shows a fuel supply system 20 for a gas turbine engine 27. A pump 22 delivers fuel through an oxygen removal system 24. A vacuum pump 25 is shown schematically removing the oxygen from the oxygen removal system 24.

The fuel is then delivered into a combustor 26 of a gas turbine engine 27, shown schematically.

Figure 2A:
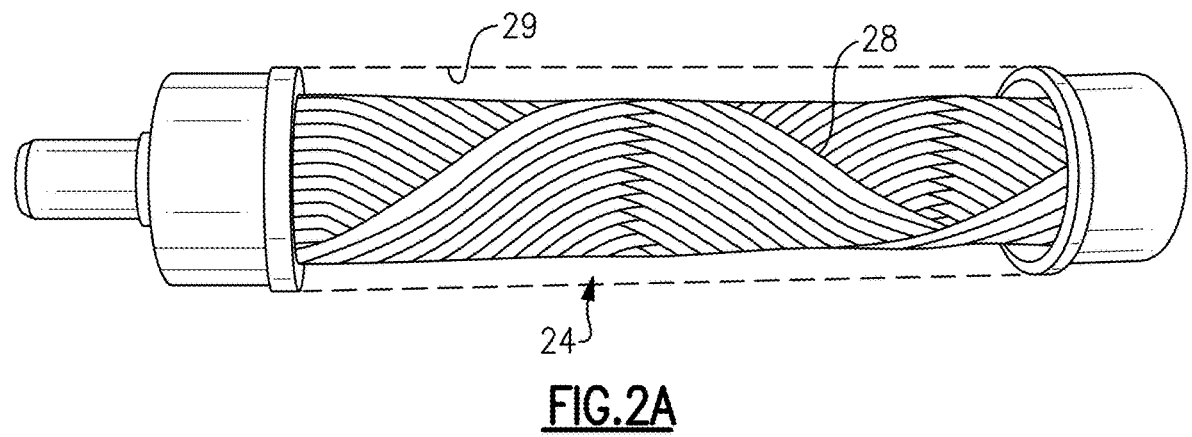
FIG. 2A shows a fiber bundle which may be utilized in the FIG. 1 system.
Figure 2B:
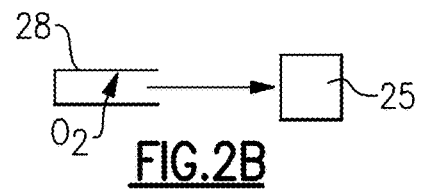
FIG. 2B shows one hollow tube in the fiber bundle.

One type of oxygen removal system 24 is illustrated in FIG. 2A. As shown, there is a bundle of wrapped hollow fiber membranes 28 inward of a canister 29. The membranes can be otherwise called hollow tube membranes 28, and are formed of an appropriate plastic. The fuel is passed over the bundle 24 and oxygen, or other gases, are removed from the fuel by passing through the wall of the tubes, as shown schematically in FIG. 2B. Once in the interior of the tubes, the vacuum pump 25 removes the oxygen.

Figure 3:
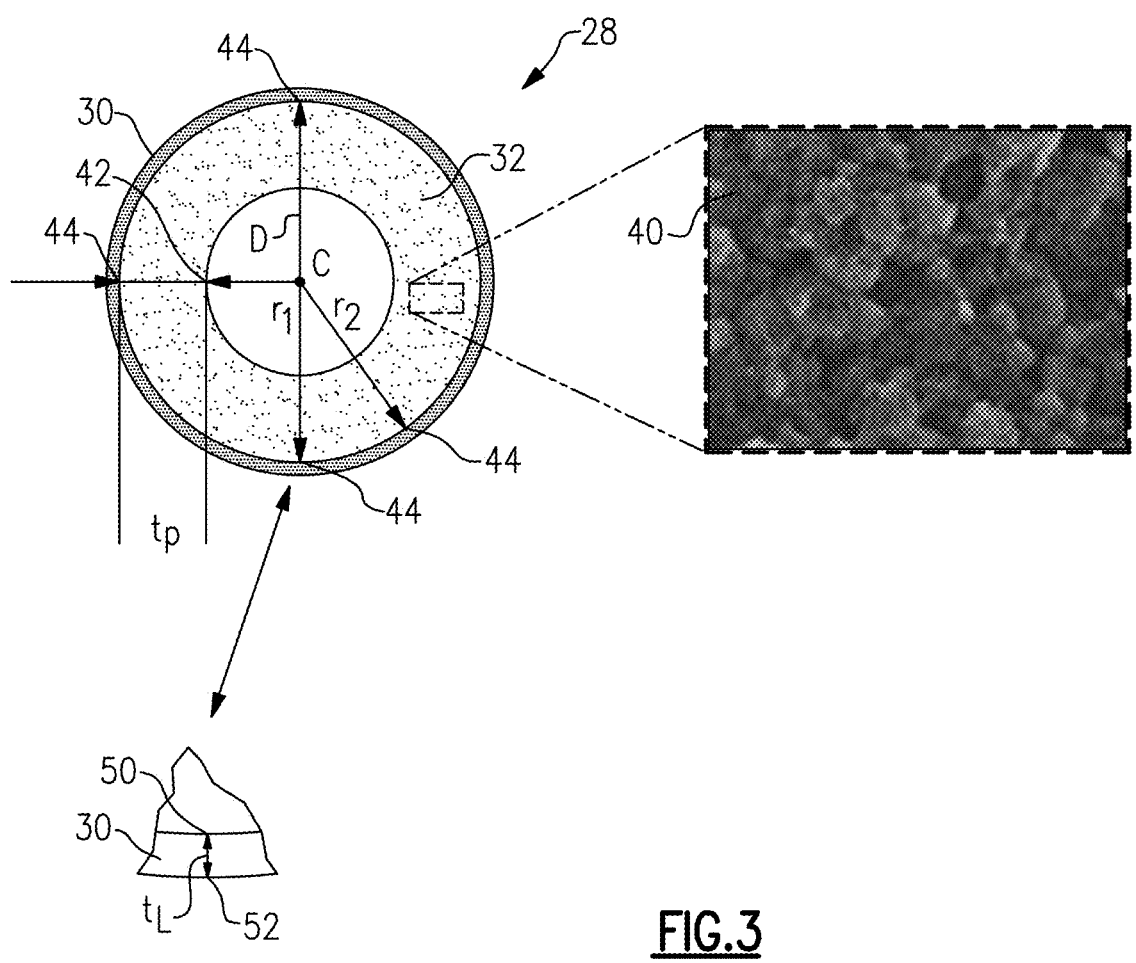
FIG. 3 shows a detail of a tube as manufactured in view of this disclosure.

FIG. 3 shows a tube 28. As shown, there is an outer selective layer 30 which is relatively dense compared to the inner support body 32. The dense outer layer 30 may be formed of a material such as Teflon AF. The layer is very thin.

The inner support body 32 is formed as a porous structure with a plurality of voids.

While Teflon AF (tetrafluoroethylene containing 2,2-bis-trifluoromethyl-4,5-difluoro-1,3-dioxole at various levels depending on the grade) is disclosed other materials such as an oxygen-permeable fluoropolymer may be utilized. Another coating example is Solvay's Hyflon AD (tetrafluoroethylene (TFE)-2,2,4-trifluoro-5-tri-fluorometoxy-1, 3-dioxole).

FIG. 3 shows a tube 28 as manufactured under this disclosure. $_h$. There is the outer layer 30. The outer selective layer 30 may be one micron or less in thickness. Preferably, the outer selective layer 30 is approximately 0.5 micron and in embodiments between 0.25 and 0.75 micron. The thickness $t_L$ of the outer selective layer 30 is measured between a radially inner point 50 and a radially outer point 52. The entire tube 28 may be between 0.5 and 2.0 millimeter in diameter.

As shown at 40, the inner support body may be formed as a microporous support and, in particular, spherulitic structures.

The inner support body may be formed of PVDF (polyvinylidene fluoride) or its copolymers. Alternatively, polyimides or polyetherimides may be utilized. The most common method currently employed to form these porous structures is "phase inversion," which is the practice of precipitating a polymer from its solution such that it is phase-separated into a polymer-rich and a polymer-lean phase, while the solvent is being removed. This process ultimately leads into a porous structure having morphology that can be affected by process parameters. Most common morphologies involve macrovoids, which afford large permeance of water for example, but other morphologies such as a spherulitic structure can be the result of process parameter selection under the general phase inversion technique.

As known, to form the spherulitic structure, an exothermic reaction should be utilized. Crystals are formed during crystallization of the selected polymers such that the PVDF. These initial crystals are called the primary nuclei. The primary nuclei will grow into spherulites. If the formation rate of the primary nuclei is low, heat generated in the growth of the primary nuclei inhibits further formation of primary nuclei and facilitate further growth of the generated primary nuclei. The crystal growth will continue until the spherulites collide with each other. Since the growth of the crystals terminates by collision, the final spherulite size depends on the number of the primary nuclei's generated first.

A common method to form the spherulitic microstructures desired for this application is "thermally induced phase separation," a special case of the phase inversion technique, whereby the polymer (e.g. PVDF) is dissolved in a high-boiling solvent at a temperature near the melting point of the polymer. Then, it is cooled at a controlled rate such as to induce phase separation by precipitation that is partly due to cooling. This happens since the polymer would be nearly insoluble to the high-boiling solvent at ambient temperature. Also, this is partly due to solvent extraction, which is the standard phase separation technique. This combination of polymer-solvent interaction and cooling rate provides additional degrees of freedom in a phase inversion process to allow for the formation of crystallites as described in this section.

In preferred embodiments, the spherulites will be 0.3 microns or less in diameter. As explained above, this is achieved by increasing the number of primary nuclei initially.

A worker of ordinary skill in this art would be able to achieve these ranges using known tube formation techniques.

Radially outer portions of the inner support body 32 preferably have pores no larger than 50 nanometers in diameter, and preferably 10 to 20 nanometers to provide support for the outer selective layer 30.

The size and morphology of the spherulitic structure is optimized for maximum creep resistance at temperature. When utilized in a fuel supply system, the tubes may see temperatures on the order of 200° F., and pressures on the order of 150 psi. The disclosed embodiment is well-suited to survive such challenging conditions.

Referring again to FIG. 3, a thickness $t_p$ of the inner support body 32 is defined as the outside radius $r_2$ to points 44 minus the inside radius $r_1$ to points 42. The greater the thickness, the stronger the fiber—but the lower its permeance, especially for the typical water purification applications. For this disclosure, permeance is not as important. Instead, it is desirable to maximize resistance to creep at temperature. Thus, it is desirable to increase/maximize the thickness. At a minimum, the thickness $t_p$ should be at least 0.25 (one-quarter) times the porous layer outer diameter D.

A porosity range is between 30 and 50 percent in disclosed embodiments. A permeability may be between 1 and 50 ml/min (at STP) per psi of pressure and per in² of porous support structure surface area.

In very general terms, one can think of the thermally-induced phase separation process as two broad categories: one where the initial concentration of the polymer (e.g. PVDF) is relatively low (under 30%) and one where it is relatively high (over 30%). In the first case, the polymer-solvent mixture becomes a meta-stable liquid-liquid phase that ultimately results in a honeycomb-like porous structure. In the second case (high initial concentration) the polymer crystallizes directly from the solution, forming sphere-like nuclei; it is therefore the latter that we want for our application.

In a method of forming such tubes, the plastic is initially heated and extruded into the tubes or fibers. It is then cooled and desirably cold quite fast.

A system for degassing a hydrocarbon liquid has a plurality of hollow tube membranes. The hollow tube membranes are formed of a plastic providing an inner support body and an outer selective layer which is denser than the inner support body. The inner support body is formed of spherulitic structures. A fuel supply system is also disclosed.

A method of degassing hydrocarbon fluid could be said to include the steps of operating a fuel pump on an aircraft to supply the hydrocarbon fluid to a combustor on a gas turbine engine, and passing the hydrocarbon fluid through a plurality of hollow tube membranes to degas the hydrocarbon fluid. The hollow tube membranes are formed of a plastic providing an inner support body and an outer selective layer which is denser than the inner support body, and the inner support body being formed of spherulitic structures.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system for degassing a hydrocarbon fluid comprising:
a plurality of hollow tube membranes, said hollow tube membranes being formed of a plastic providing an inner support body and an outer selective layer which is denser than said inner support body, and said inner support body formed of spherulitic structures.

2. The system as set forth in claim 1, wherein said spherulitic structures have a size that is less than or equal to 0.3 micron.

3. The system as set forth in claim 1, wherein said inner support body is formed of one of PVDF, one of its co-polymers, polyimides, or a polyetherimide.

4. The system as set forth in claim 3, wherein said inner support body has radially outer areas with pores less than 50 nm.

5. The system as set forth in claim 4, wherein said pores are between 10 and 20 nm.

6. The system as set forth in claim 3, wherein a porosity of said inner support body is between 30 and 50 percent.

7. The system as set forth in claim 1, wherein a thickness of said inner support body is at least 0.25 times an outer diameter of said inner support body.

8. The system as set forth in claim 1, wherein a thickness of said outer selective layer is less than 3.0 micron.

9. The system as set forth in claim 8, wherein said thickness is between 0.25 and 0.75 micron.

10. The system as set forth in claim 3, wherein said outer selective layer is an oxygen-permeable fluoropolymer.

11. A fuel supply system for a gas turbine engine comprising:
a pump, an oxygen removal system and a combustor, said pump configured to move fuel through said oxygen removal system and to said combustor; and
said oxygen removal system having a plurality of hollow tube membranes, said hollow tube membranes being formed of a plastic providing an inner support body and an outer selective layer which is denser than said inner support body, and said inner support body formed of spherulitic structures.

12. The fuel supply system as set forth in claim 11, wherein said spherulitic structures have a size that is less than or equal to 0.3 micron.

13. The fuel supply system as set forth in claim 11, wherein said inner support body is formed of one of PVDF, one of its co-polymers, polyimides, or a polyetherimide.

14. The fuel supply system as set forth in claim 13, wherein said inner support body having radially outer areas with pores less than 50 nm.

15. The fuel supply system as set forth in claim 14, wherein said pores are between 10 and 20 nm.

16. The fuel supply system as set forth in claim 13, wherein a porosity of said inner support body is between 30 and 50 percent.

17. The fuel supply system as set forth in claim 13, wherein a thickness of said inner support body is at least 0.25 times an outer diameter of said inner support body.

18. The fuel supply system as set forth in claim 11, wherein a thickness of said outer selective layer is less than 3.0 micron.

19. The fuel supply system as set forth in claim 18, wherein said thickness is between 0.25 and 0.75 micron.

20. A method of degassing hydrocarbon fluid comprising the steps of:
   operating a fuel pump on an aircraft to supply the hydrocarbon fluid to a combustor on a gas turbine engine;
   passing the hydrocarbon fluid through a plurality of hollow tube membranes to degas the hydrocarbon fluid; and
   the hollow tube membranes being formed of a plastic providing an inner support body and an outer selective layer which is denser than said inner support body, and said inner support body formed of spherulitic structures.

* * * * *